United States Patent
Liu et al.

(10) Patent No.: US 7,421,469 B1
(45) Date of Patent: Sep. 2, 2008

(54) INITIATING A COLLABORATIVE COMPUTING SESSION FROM AN ADVANCED CAPABILITY TELEPHONE

(75) Inventors: Phillip C. Liu, Sunnyvale, CA (US); Venkatram R. Kuditipudi, Los Altos, CA (US); Jeffrey A. Smith, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 10/606,451

(22) Filed: Jun. 26, 2003

(51) Int. Cl.
*G06F 15/16* (2006.01)
(52) U.S. Cl. .................... 709/204; 709/205; 709/206
(58) Field of Classification Search ......... 709/204–206; 379/67.1, 142
See application file for complete search history.

(56) References Cited

U.S. PATENT DOCUMENTS

| | | | |
|---|---|---|---|
| 5,652,866 A | 7/1997 | Aldred et al. | |
| 5,751,338 A | 5/1998 | Ludwig, Jr. | |
| 5,758,079 A * | 5/1998 | Ludwig et al. | 709/204 |
| 5,781,727 A * | 7/1998 | Carleton et al. | 709/205 |
| 5,854,893 A * | 12/1998 | Ludwig et al. | 709/204 |
| 6,115,386 A | 9/2000 | Bell et al. | |
| 6,266,539 B1 | 7/2001 | Pardo | |
| 6,275,574 B1 | 8/2001 | Oran | |
| 6,404,870 B1 | 6/2002 | Kia et al. | |
| 6,453,039 B1 | 9/2002 | Cutting et al. | |
| 6,542,499 B1 | 4/2003 | Murphy et al. | |
| 6,546,083 B1 | 4/2003 | Chaves et al. | |
| 6,570,869 B1 | 5/2003 | Shankar et al. | |
| 6,728,756 B1 * | 4/2004 | Ohkado | 709/205 |
| 6,732,145 B1 * | 5/2004 | Aravamudan et al. | 709/204 |
| 6,981,256 B2 * | 12/2005 | Jawahar et al. | 718/101 |
| 7,051,049 B2 * | 5/2006 | Samn | 707/200 |
| 7,152,093 B2 * | 12/2006 | Ludwig et al. | 709/204 |
| 7,185,054 B1 * | 2/2007 | Ludwig et al. | 709/204 |
| 7,206,809 B2 * | 4/2007 | Ludwig et al. | 709/204 |
| 2001/0051865 A1 | 12/2001 | Kerr et al. | |
| 2001/0056466 A1 * | 12/2001 | Thompson et al. | 709/204 |
| 2002/0065912 A1 * | 5/2002 | Catchpole et al. | 709/224 |
| 2002/0143877 A1 * | 10/2002 | Hackbarth et al. | 709/205 |
| 2002/0147777 A1 * | 10/2002 | Hackberth et al. | 709/205 |
| 2002/0194272 A1 * | 12/2002 | Zhu | 709/204 |
| 2003/0041108 A1 * | 2/2003 | Henrick et al. | 709/205 |
| 2004/0199580 A1 * | 10/2004 | Zhakov et al. | 709/204 |

* cited by examiner

*Primary Examiner*—Krisna Lim
(74) *Attorney, Agent, or Firm*—Cesari and McKenna LLP

(57) ABSTRACT

In one embodiment, a system is provided for initiating a collaborative computing session during a telephone call involving a plurality of users. The system includes a first advanced capability telephone operable to issue an initiate meeting request in response to an activation signal at the first advanced capability telephone. A first computer in communication with the first advanced capability telephone is operable to issue a start meeting request for establishing a meeting zone for the collaborative computing session. The first computer is operable to open a first collaborative meeting window for enabling a user of the first computer to participate in the collaborative computing session. The first advanced capability telephone is operable to issue a join meeting request to a second advanced capability telephone for causing a second collaborative meeting window to be opened at a second computer for enabling a user of the second computer to participate in the collaborative computing session.

19 Claims, 6 Drawing Sheets

INITIATING A COLLABORATIVE COMPUTING SESSION FROM AN ADVANCED CAPABILITY TELEPHONE

CROSS-REFERENCE TO CD-ROM APPENDIX

Appendix A is a CD-ROM appendix containing computer code to be executed by a microprocessor in accordance with the present invention. CD ROM Appendix A is a computer program listing appendix having 6 files. Appendix A is submitted in two (2) identical copies of CD in IBM PC/XT/AT format and is MS-DOS compatible. A listing of files is included here as Appendix B. CD-ROM Appendix A and Appendix B are herein incorporated by reference in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates generally to computer networks and, more particularly, to initiating a collaborative computing session from an advanced capability telephone.

BACKGROUND OF THE INVENTION

Internet Protocol (IP) telephony solutions are being deploying in place of standard publicly switched telephone network (PSTN) systems. An IP telephony system can be simpler to manage and save companies money, for example, by avoiding per-call toll charges.

One form of IP telephony is a telephone unit which can plug into a local area network (LAN), such as an Ethernet, which is generally used to link computers together. Some versions of such an IP telephone may run a robust operating system which supports programmability and custom applets, and perform other functions not possible with regular telephones. For this reason, some IP telephones may be considered "smart phones."

Another form of IP telephony is an IP software telephone ("softphone") application, which can run on multimedia enabled personal computers (PCs). An IP "softphone" application allows callers to make phone calls on their PCs using headphones and microphones plugged into their PCs.

Various systems and services are now being offered to allow two or more users to participate in an on-line, collaborative meeting, in which the users may share and collectively review or edit applications, files, documents, images, etc., in real time. Video may be available or supported for these meetings. One such service is provided by WebEx Communications, Inc. of San Jose, Calif. Collaborative computing, and various systems and methods for same, is described in more detail, for example, in U.S. patent application Ser. No. 09/751,548, entitled "Scalable Distributed System For Collaborative Computing," filed on Dec. 29, 2000, the entirety of which is hereby incorporated by reference. Typically, the on-line meeting are initiated through one or more web sites (e.g., co-branded with a company) and users are invited to join via email. After joining such an on-line meeting using a web browser of their personal computers (PCs), the users typically dial into a conference call for reliable audio.

In some situations, however, the sequence of events may be reversed. In particular, as two or more people are involved in a telephone call, it may be desirable for them to initiate a collaborative, on-line meeting session to share documents, images, applications, or other files for common viewing, editing, review, or other forms of collaboration.

Systems and techniques have previously been developed which allow collaboration computing applications to be launched from an IP softphone, which is running on the same PC. But, users are not able to launch collaboration sessions from a physically separate IP telephone. This is a problem since people are accustomed to making and receiving voice calls on their physical phones, not on their computers. Furthermore, in the modern world, integration of systems for a seamless user experience is important. Users have come to expect and even demand connectivity and compatibility of their various communications systems and electronic devices.

SUMMARY OF THE INVENTION

According to one embodiment of the present invention, a system is provided for initiating a collaborative computing session during a telephone call involving a plurality of users. Each user has a respective computer and at least some of the users have respective advanced capability telephones. The system includes telephone activation means present on a first advanced capability telephone for generating an initiate meeting request in response to an activation signal at the first advanced capability telephone. Computer activation means is present on a respective computer of the user having the first advanced capability telephone for establishing a meeting zone for the collaborative computing session and for opening a first collaborative meeting window on the respective computer of the user having the first advanced capability telephone.

According to another embodiment of the present invention, a method is provided for initiating a collaborative computing session during a telephone call involving a plurality of users, wherein each user has a respective computer and at least some of the users have a respective advanced capability telephone. The method includes the following: issuing an initiate meeting request from a first advanced capability telephone to the respective computer of the user having the first advanced capability telephone in response to an activation signal at the first advanced capability telephone; establishing a meeting zone for the collaborative computing session; and opening a first collaborative meeting window on the respective computer of the user having the first advanced capability telephone.

According to yet another embodiment of the present invention, a system is provided for initiating a collaborative computing session during a telephone call involving a plurality of users. The system includes a first advanced capability telephone operable to issue an initiate meeting request in response to an activation signal at the first advanced capability telephone. A first computer in communication with the first advanced capability telephone is operable to issue a start meeting request for establishing a meeting zone for the collaborative computing session. The first computer is operable to open a first collaborative meeting window for enabling a user of the first computer to participate in the collaborative computing session. The first advanced capability telephone is operable to issue a join meeting request to a second advanced capability telephone for causing a second collaborative meeting window to be opened at a second computer for enabling a user of the second computer to participate in the collaborative computing session.

Important technical advantages of the present invention are readily apparent to one skilled in the art from the following figures, descriptions, and claims.

BRIEF DESCRIPTION OF THE DRAWINGS

For a more complete understanding of the present invention, and for further features and advantages, the following description, taken in conjunction with the accompanying drawings, is provided in which.

DETAILED DESCRIPTION OF THE PREFERRED EMBODIMENTS

Figure 1A:
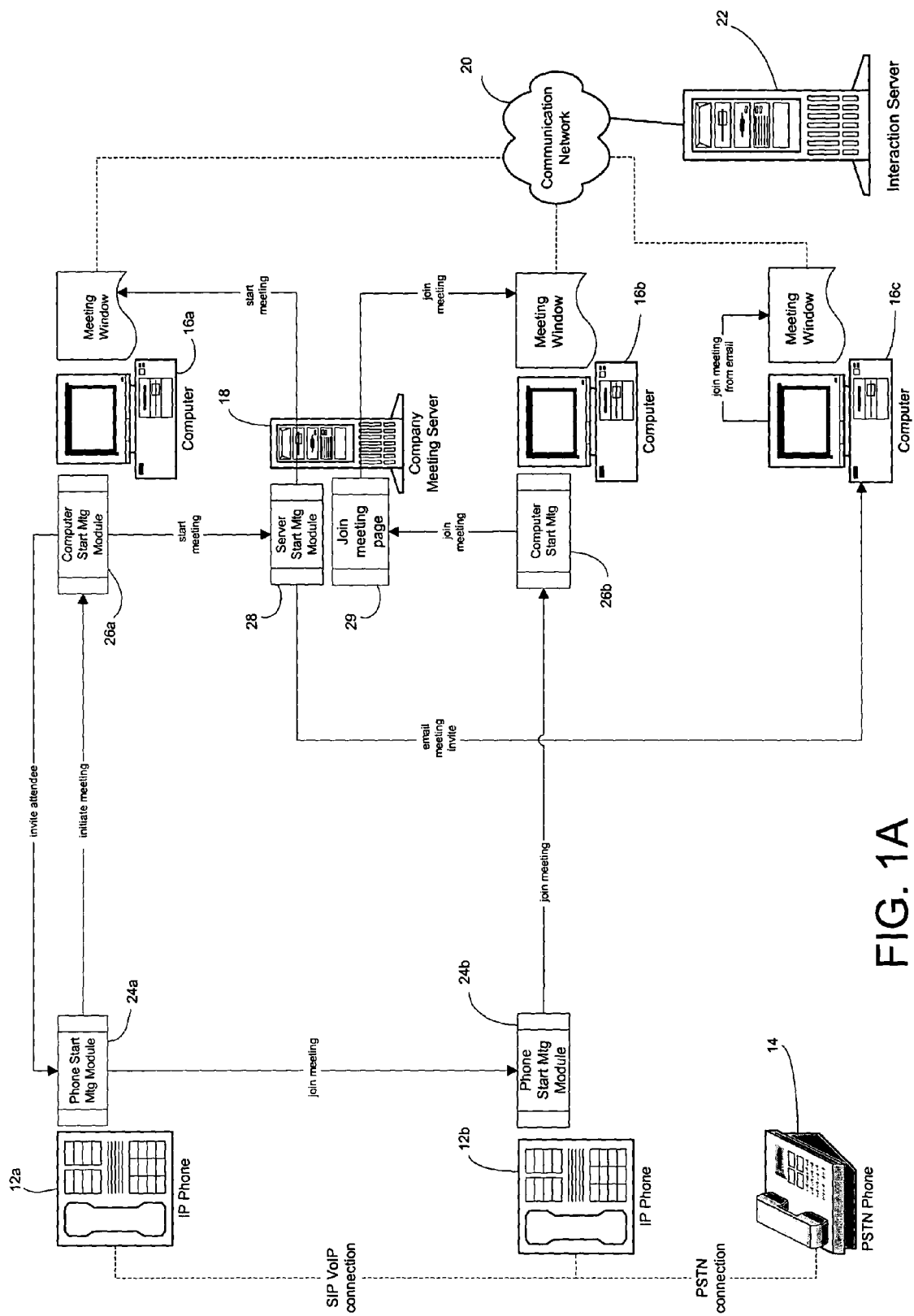
FIG. 1A illustrates an exemplary environment in which systems and method for initiating a collaborative computing session from an advanced capability telephone, according to embodiments of the present invention, may operate.

Turning first to the nomenclature of the specification, the detailed description which follows is represented largely in terms of processes and symbolic representations of operations performed by conventional computer components, such as a local or remote central processing unit (CPU), processor, server, or other suitable processing device associated with a general purpose or specialized computer system, memory storage devices for the processing device, and connected local or remote pixel-oriented display devices. These operations may include the manipulation of data bits by the processing device and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For purposes of this discussion, a process, method, routine, or sub-routine is generally considered to be a sequence of computer-executed steps leading to a desired result. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer system are often referred to in terms such as adding, comparing, moving, searching, or the like, which are often associated with manual operations performed by a human operator. It must be understood that no involvement of the human operator may be necessary, or even desirable, in the present invention. Some of the operations described herein are machine operations performed in conjunction with the human operator or user that interacts with the computer or system.

In addition, it should be understood that the programs, processes, methods, and the like, described herein are but an exemplary implementation of the present invention and are not related, or limited, to any particular computer, system, apparatus, or computer language. Rather, various types of general purpose computing machines or devices may be used with programs constructed in accordance with the teachings described herein. Similarly, it may prove advantageous to construct a specialized apparatus to perform one or more of the method steps described herein by way of dedicated computer systems with hard-wired logic or programs stored in non-volatile memory, such as read-only memory (ROM).

Overview

According to embodiments of the present invention, systems and methods are provided which enable users on physical IP telephones or other phones with advanced capabilities ("advanced capability telephones") to communicate with the users' computers to automatically host and join collaborative computing sessions. In one embodiment, a user on a telephone call with one or more other users can press a single button on his/her IP telephone to launch a collaborative computing session or on-line meeting in which the user can participate via his/her computer. The other users on the call are then automatically brought into the on-line meeting on their respective computers, or alternatively, they may receive email invitations to join the meeting. Thus, with embodiments of the invention, a collaborative session on each of the called parties' computers can be easily started from within a telephone call.

In some embodiments, an IP telephone can be used to facilitate the collaborative session since the IP telephone can process and exchange data with computers and other IP telephones. A software application running on a user's computer may listen for requests from the IP telephone to launch collaboration software for the meeting. For more advanced IP phone models, a software application running on the IP telephone can directly make requests to a meeting initiator application on a user's computer. For less advanced IP phone models, one or more servers, running suitable server applications may be used to mediate requests between the users' IP telephones and the respective user computers.

Exemplary Environments

Referring now to the drawings, FIG. 1A illustrates an exemplary environment in which systems and methods for initiating a collaborative computing session from an advanced capability telephone, according to embodiments of the present invention, may be used. In this environment, a number of participants may communicate in a telephone call or telephone conference. The participants may also interact in an on-line, interactive or collaborative setting. Such a telephone call/conference and on-line setting can be for a meeting, training or education, support, or any other event that may require a number of participants to work together, interact, collaborate, or otherwise participate.

Each participant may be using or operating a respective telecommunications device which can be, for example, an Internet Protocol (IP) phone 12 (separately labeled 12a, 12b) or other type of telephone 14. Telephone 14 can be a normal telephone, wired or mobile, which provides basic telephony features, such as, for example, the ability to make and receive calls, call waiting, call forwarding, conferencing, speed-dialing, voicemail, etc. In this embodiment, an IP telephone 12 is representative of any advanced capability telephone which provides the features of a normal telephone along with other useful features, such as, for example, the ability to run custom applets, access email, manage contact databases, and provide other personal data assistant (PDA)-like functions. A IP telephone 12 may be able to identify (e.g., using caller ID features or a contact database) or maintain the telephone number and other information (e.g., name, and email address) for each participant in a telephone call. An IP telephone 12 transmits/receives data and information using IP or other computer protocol for LAN, WAN, other (packet-switched) network for connecting computers. In some embodiments, IP telephones 12 can be wireless devices capable of communicating via 802.11, Bluetooth, or other wireless protocols and technologies. IP telephones can make telephone calls using Voice Over Internet Protocol (VOIP) or regular public switched telephone network (PSTN) lines.

In one embodiment, one or more IP telephones 12 can be one available from Pingtel Corp. of Woburn, Mass. Such IP telephone 12 can be relatively advanced, for example, having its own operating system for running various programs. IP telephones can run Java telephony applications, communicate with personal computers (PCs) and other IP telephones using Session Initiated Protocol (SIP), and perform other functions not possible with regular telephones.

Each participant may also be using or operating a computer 16 (separately labeled 16a, 16b, 16c). Each computer 16 can be, for example, a desktop personal computer (PC), a laptop computer, or a workstation, a personal digital assistant (PDA), an Internet-enabled television, or other electronic device operating under the control of a suitable operating system (OS), such as MS-DOS, MacINTOSH OS, WINDOWS NT, WINDOWS 95, WINDOWS 2000, WINDOWS XP, SOLARIS, OS/2, UNIX, LINUX, XENIX, HP-UX, PALM OS, and the like. Each computer 16 may be operable to run software applications (e.g., in the form of code modules) which may be installed, received, or downloaded. At least some of these software applications may support specific functions, such as, for example, functions related to an on-line, interactive collaborative meeting. One service for on-line, collaborative meetings is provided by WebEx Communications, Inc. of San Jose, Calif. In one embodiment, each computer 16 may locally execute a conventional web browser program that allows information to be exchanged with the World Wide Web (WWW). Any of a variety of conventional web browsers are available, such as NETSCAPE NAVIGATOR from Netscape Communications Corp., INTERNET EXPLORER from Microsoft Corporation, and others that allow convenient access and navigation of the Internet. Each computer 16 may include a suitable input device (e.g., keyboard, mouse, stylus, keypad, etc.) and output device (e.g., monitor, display, speech, voice, or other device supporting the presentation of audible/visual information), with capability for visual and/or auditory presentation.

According to embodiments of the present invention, systems and methods are provided for integrating IP telephones 12 and computers 16 so that users are able to easily start an on-line, collaborative meeting from their IP telephones 12. In one embodiment, for example, during a telephone conference between one or more users, one of the users may be able to press a button on his/her IP telephone 12 to instantly start a collaborative meeting on his/her computer 16. Furthermore, if other users are participating in the telephone conference via IP telephones 12, they will automatically be added to the on-line, collaborative meeting on their respective computers 16. Other users on the same telephone conference who are participating via other types of telephone 14 (e.g., PSTN telephone) will receive an email invitation on their computers 16 to join the on-line meeting. This significantly simplifies the on-line meeting process. Thus, users can be in the middle of a telephone call and spontaneously decide they want to visually collaborate on a document. A caller can press one button on his/her IP telephone 12 to automatically start an on-line meeting in which all users participate using their respective computers 16.

As further depicted in FIG. 1A, at least one IP telephone 12 of a user may be in communication with or connected to a computer 16 for the same user. As used herein, the terms "connected," "coupled," or any variant thereof, mean any connection or coupling, either direct or indirect, between two or more elements; such connection or coupling can be physical or logical. In various embodiments, the computers 16 and IP telephones 12 of one or more users may be connected together in a suitable local area network (LAN) or wide area network (WAN), which may be wired or wireless and which may support suitable protocols and technologies (e.g., Ethernet, 802.11, and Bluetooth). Furthermore, the IP telephones 12 of two or more users may be connected, for example, via a connection that supports Session Initiated Protocol (SIP) and/or Voice Over Internet Protocol (VOIP). IP telephones 12 may be connected to other types of telephone 14, for example, via a connection for a public switched telephone network (PSTN).

The computers 16 and IP telephones 12 may be in communication with a company meeting server 18. The company meeting server 18 may comprise one or more server computers which store information (e.g., content) and run applications for supporting an on-line collaborative meeting. This server 18 may maintain or support a website for collaborative meetings for a particular company, with which one or more of the users are associated. Such company website may have a suitable universal resource locator (URL). Company meeting server 18 may support documents and web pages written in HyperText Markup Language (HTML), eXtensible Markup Language (XML), and other markup languages, as well as communication for same. In one embodiment, the company meeting server 18 may maintain information and run programs for a company's meeting site. This information may include, for example, one or more PHP: Hypertext Preprocessor (PHP) pages.

In one embodiment, the company meeting server 18 can be operated or maintained by the particular company with which one or more users are associated and, as depicted, may be part of a local area network (LAN) or wide area network (WAN) to which one or more computers 16 and IP telephones 12 are connected. In another embodiment, the company meeting server 18 can be operated or maintained by another entity, such as one or more of the users and/or a third-party service provider (e.g., WebEx Communications, Inc. of San Jose, Calif.). In some situations, the company meeting server 18 can be separate from the LAN or WAN of the company and in communication with the various computers 16 and IP telephones 12 via, for example, a suitable communications network 20.

Each computer 16 may be coupled to the communications network 20, and may appear as a client computer thereon. Network 20 can comprise one or more suitable data networks, such as the Internet, which can be used to deliver content. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Network 20 may also comprise or be supported by one or more suitable communication networks, such as, for example, a telecommunications network. A telecommunications network allows communication via one or more telecommunications line, such as an analog telephone line, a digital T1 line, a digital T3 line, or an OC3 telephony feed. The telecommunications network may include a public switched telephone network (PSTN) and/or a private system (e.g., cellular system) implemented with a number of switches, wire lines, fiber-optic cable, land-based transmission towers, space-based satellite transponders, etc. In one embodiment, the telecommunications network may include any other suitable communication system, such as a specialized mobile radio (SMR) system. As such, the telecommunications network may support a variety of communications, including, but not limited to, local telephony, toll (i.e., long distance), and wireless (e.g., analog cellular system, digital cellular system, Personal Communication System (PCS), Cellular Digital Packet Data (CDPD), ARDIS, RAM Mobile Data, Metricom Ricochet, paging, and Enhanced Specialized Mobile Radio (ESMR)). The telecommunications network may utilize various calling protocols (e.g., Inband, Integrated Services Digital Network (ISDN) and Signaling System No. 7 (SS7) call protocols) and other suitable protocols (e.g., Enhanced Throughput Cellular (ETC), Enhanced Cellular Control (EC2), MNP10, MNP10-EC, Throughput Accelerator (TXCEL), Mobile Data Link Protocol, etc.). Transmissions over the telecommunications network system may be analog or digital. Transmission may also include one or more infrared links (e.g., IRDA). Such telecommunications network may also include one or more of the connections (e.g., SIP, VOIP, and PSTN) which connect IP telephones 12 and other types of telephone 14.

The on-line meeting of the various users may be supported by an interaction server 22 which can be maintained or operated by one or more of the users and/or a third-party service provider (such as, WebEx Communications, Inc. of San Jose, Calif.). The interaction server 22 can be a computer system that is connected to network 20, and which may comprise and appear as one or more server computers thereon. Interaction server 22 may work in conjunction with computers 16 and company meeting server 18 to support the on-line collaborative meeting. Interaction server 22 may store information (e.g., content) and application modules which can be provided to the computers 16 and company on-line meeting server 18. In some embodiments, these application modules are downloadable to the computers 16 and on-line meeting server 18, and may support various functions that may be required for an interactive meeting or collaborative effort among the users. The computers 16 and the interaction server 22 may interact in a client-server architecture. The client-server architecture can provide high performance and security for a multi-participant collaborative environment.

For the facilitated and simplified initiation of an on-line meeting, one or more IP telephones 12 may include or run a phone start meeting module 24 (separately labeled 24*a*, 24*b*). In one embodiment, the phone start meeting module 24 can be implemented as a JAVA application that runs on the IP telephone 12. This application enables a user to activate or start an on-line collaborative meeting with other users connected via IP telephones 12 or regular phones 14, for example, by pushing a button (e.g., "start meeting" button) on his/her IP telephone 12. The start meeting button can be any suitable input mechanism for activation, such as a mechanical button on phone 12 or an icon on a display of the IP telephone 12. In some embodiments, phone start meeting module 24 may be selected or launched by a user to display and/or enable the "start meeting" button; in other embodiments, the start meeting button is always visible on IP telephone 12, and pressing it causes the phone start meeting module 24 to run. When "pressed," the start meeting button may generate an activation signal which initiates one or more routines of the phone start meeting module 24. These routines may provide or support the functionality for enabling the IP telephone 12 to cooperate with other devices in the system (e.g., computers 16, company meeting server 18, or other IP telephones 12) for establishing any necessary lines of communication between devices and respective users. For example, the phone start meeting module 24 in one IP telephone 12 may communicate with other phone start meeting modules 24 running on other IP telephones to invite other users to join the on-line collaborative meeting.

One or more computers 16 may include or run a computer start meeting module 26 (separately labeled 26*a*, 26*b*). In one embodiment, computer start meeting module 26 can be implemented as a Win32 C++ application running on a computer 16 connected to an IP telephone 12. This application communicates with a companion phone start meeting module 24 running on the IP telephone 12. The computer start meeting module 26 starts or initiates a session for an on-line collaborative meeting on the user's computer 26. The computer start meeting module 26 may send various information or data, such as a meeting key identifier, to the phone start meeting module 24 on the associated IP telephone 12. The meeting key identifier, which may be created or generated when the on-line meeting is established, serves to identify the meeting.

The computer start meeting module 26 may dynamically open one or more configuration screens on the user's computer 16. Such configuration screens (which can be specific for a company) are used for the input, display, or verification of information for establishing a meeting session. In one embodiment, a user who will act as the host for the on-line meeting may need to fill out one or more of the following fields at a configuration screen: personal identifier (ID) and password (PWD) for the user; a URL for his/her company site (e.g., https://company.webex.com); a company site identifier (SID); and a partner identifier (PID). In another embodiment, one or more, up to all, of the same fields are filled in automatically by the computer 16 using information previously stored or received.

For added security, in some embodiments, one or more other forms of password authentication are provided or supported for on-line, collaborative meetings initiated from IP telephones 12. This will prevent unauthorized users or people from joining confidential private meetings. One additional password, for example, can be a meeting password that is specific for a particular meeting. Such a meeting password can be automatically generated (e.g., randomly selected alphanumeric combination) or specified by a host user (e.g., entered via a suitable dialog prompt). The password may be distributed to various servers (e.g., interaction server) for setting up a meeting and to users for joining the meeting. For this additional password authentication, the configuration screens may include appropriate fields for the host user to enter or select information.

A server start meeting module 28 and a join meeting page 29 may run on company meeting server 18. Server start meeting module 28 may include one or more applications for, among other things, adding attendees and starting the meeting. In one embodiment, server start meeting module 28 may include, interact, or be implemented with one or more PHP: Hypertext Preprocessor (PHP) pages that reside on the user's company meeting site. PHP is a widely-used Open Source general-purpose scripting language that is especially suited for Web development and can be embedded into HTML. PHP pages may include code that, in a client-server architecture, is executable on a server computer (e.g., company meeting server 18) but provides features/functions at a client computer (e.g., computers 16). The PHP pages can be a part of join meeting page 29.

In one embodiment, the PHP pages at company meeting server 18 may include a log-in page (also referred to as "aasm.php"), an add attendees page (also referred to as "aa.php"), and a start meeting page (also referred to as "sm.php"). These pages can call or request each other in succession to automatically login, email meeting invitations, and start the meeting using, for example, a URL API from the company meeting server 18. The requesting application may only need to make one URL request to the log-in page to initiate this functionality.

An exemplary execution of the PHP pages is as follows. Computer start meeting module 26 may automatically launch a web browser on the computer 16, and may dynamically set the application to the log-in page for a meeting site supported by the company meeting server 18. The requesting application, computer start meeting module 26, posts various parameters to the log-in page. These parameters may include, for example, the host user's login name or identifier (ID), host user's password (PW), the meeting key (MK) for the scheduled meeting, the meeting password (MPW), and user invitation list (e.g., email addresses and/or name of each attendee to be invited). The log-in page logs the user in (AT=LI). A meeting window is opened at the host user's computer 16. The meeting window is a screen when the user may collaborate with others to view, modify, and work on files, documents, applications, images, etc. If email address parameters (EAN values) are present, then the log-in page requests the add attendees page so that the other users can be added to the meeting. The add attendees page adds the other users to the on-line meeting (AT=AA), and emails each of them invitations to the meeting. Thereafter, the add attendees page requests the start meeting page. If there are no EAn values, then no invitations are emailed and the start meeting page is requested directly. The start meeting page starts the meeting (AT=HM) on the host user's computer 16.

Figure 1B:
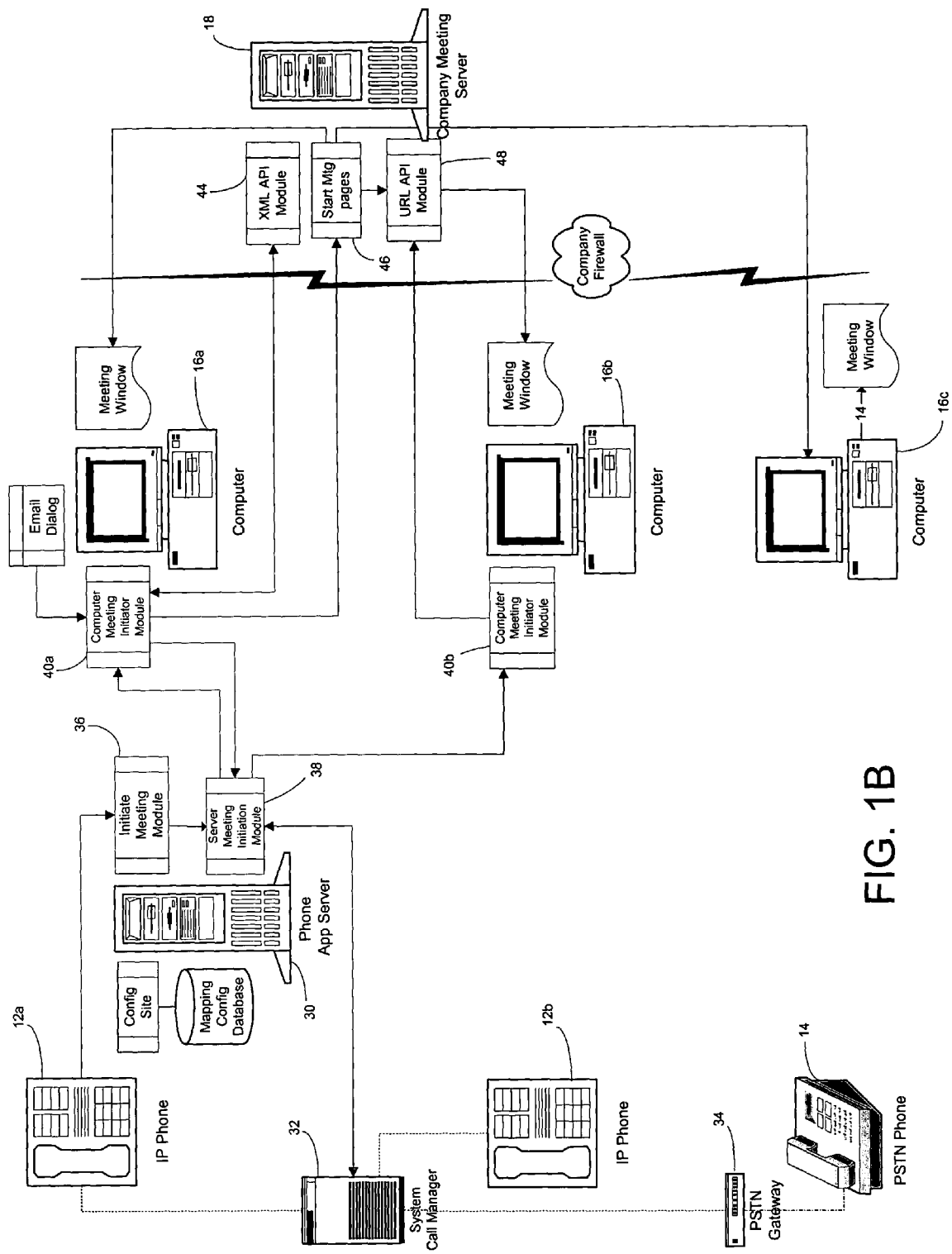
FIG. 1B illustrates another exemplary environment in which systems and method for initiating a collaborative computing session from an advanced capability telephone, according to embodiments of the present invention, may operate.

FIG. 1B illustrates another exemplary environment in which systems and method for initiating a collaborative computing session from an advanced capability telephone (e.g., IP telephone), according to embodiments of the present invention, may operate.

As depicted, this environment includes other types of telephones 14, computers 16, and company meeting server 18, which can be similar to the items with like names and reference numerals described herein with respect to FIG. 1A.

In this embodiment, IP telephones 12 can be less advanced than those described with reference to the embodiment of FIG. 1A. For example, these IP telephones 12 of the embodiment of FIG. 1B can be a 7900 series IP telephone available from Cisco Systems, Inc. of San Jose, Calif. Such an IP telephone may display XML data, essentially functioning as a mini web-browser. But the telephone may have limited intelligence and may not provide any application environment. Thus, IP telephone 12 in this case may not be able to run applications, such as, a phone start meeting module 24 (FIG. 1A). As such, to provide more functionality and features, in the environment of FIG. 1B, one or more IP telephones 12 can be connected to or in communication with a company telephone application server 30, a call manager system 32, and/or a PSTN gateway 34.

Company telephone application server 30 may support or implement a private branch exchange (PBX) telephone system, which is maintained or operated by or for a company or other entity. The PBX system may provide various enhanced features for telephony applications, such as least-cost routing and call-detail recording. Company telephony application server 30 can be implemented on any suitable server machine. In some embodiments, company telephone application server 30 works in conjunction with IP telephones 12 to provide for almost instant activation of an on-line meeting that will include all the call participants.

Call manager system 32 can be a device which functions to maintain information identifying the IP telephones 12 and other types of telephones 14 (e.g., PSTN) to which system 32 is connected. In one embodiment, call manager system 32 can be implemented with a server application, such as one available from Cisco Systems, Inc of San Jose, Calif. PSTN gateway 34 functions as an interface for communication between a normal (e.g., PSTN) telephone and call manager system 32. In one embodiment, PSTN gateway 34 can be implemented with suitable network hardware available from, for example, Cisco Systems, Inc., 3COM, or Nortel.

As with the environment depicted in FIG. 1A, the systems and methods operating in the environment of FIG. 1B enable a user at an IP telephone 12 to press a button on his/her phone and have an on-line collaborative meeting start automatically on a respective computer 16. Other users with IP telephones 12 would then automatically join the collaborative meeting on their computers 16. Users with other types of telephones 14 would receive an email invitation to join the meeting.

To accomplish this, company telephone application server 30 may run an initiate meeting module 36. The initiate meeting module 36 is requested when the user presses a "start meeting" button on a respective IP telephone 12 during a telephone call or conference. In one embodiment, the initiate meeting module 36 can be an ASP.NET application, which is compiled common language runtime code running on the server 30. A server meeting initiation module 38, which may also run on the customer telephone application server 30, can be requested by the initiate meeting module 36. The server meeting initiation module 38 is operable to get a list of the IP telephones 12 and the other telephones 14 which are in the conference call with first IP telephone 12, for example, by making a JTAPI, TAPI or XML request to the call manager system 32. Server meeting initiation module 38 may also invite various users to join an on-line meeting using their respective computers 16, or alternatively, may automatically launch the on-line meeting at the computers 16 for various users.

A computer meeting initiator module 40 (separately labeled 40a, 40b) may run on one or more computers 16. The computer meeting initiator module 40, which is requested by the server meeting initiation module 38, communicates with the company meeting server 18 to create or start a meeting session. This application may receive various information back from the server 22, including for example, a meeting key and a list of computers 16 of participating users which are also running computer meeting initiator modules 40. For any computer 16 which is not running a computer meeting initiator module 40, module 40 of the host user's computer 16 will facilitate the creation of an email for contacting the respective user (e.g., by opening an email dialog window for requesting the email address of the other user) so that the other user can be invited to join the meeting.

In one embodiment, company meeting server 18 includes an eXtensible Markup Language (XML) API server module 44, one or more start meeting pages 46, and a universal resource locator (URL) API module 48. XML API server module 44 provides the status of an on-line meeting to one or more users. Start meeting webpages 46 may begin a meeting session on the initiation server, for example, by launching one or more applications for supporting the meeting. The start meeting webpages 46 can also send email invitations to users of various computers 16. URL API server module 48, in conjunction with start meeting pages 46, may start an on-line meeting window at one or more computers 16.

Referring to FIGS. 1A and 1B, the embodiments depicted in systems, and corresponding methods, for initiating a collaborative computing session from an IP telephone 12 may be incorporated into or implemented in the IP telephones 12, the computers 16, the company meeting server 18, the phone application server 30, the call manager system, 32, and/or the interaction server 22.

In some embodiments, the invention integrates IP telephones 12 and computers 16 for a seamless user experience for collaboration with telephone and on-line communication. During a telephone call, a user is able to readily start on-line collaborative meetings from his/her IP telephone 12, for example, by pressing a button on his/her IP telephone 12. If the other users are participating in the telephone call using IP telephones 12, they will automatically be added to the on-line meeting on their respective computers 16. Other people on the same call with regular (e.g., PSTN) telephones 14 will receive email invitations to join the meeting.

Exemplary Interaction Server or Server Cluster

Figure 2:
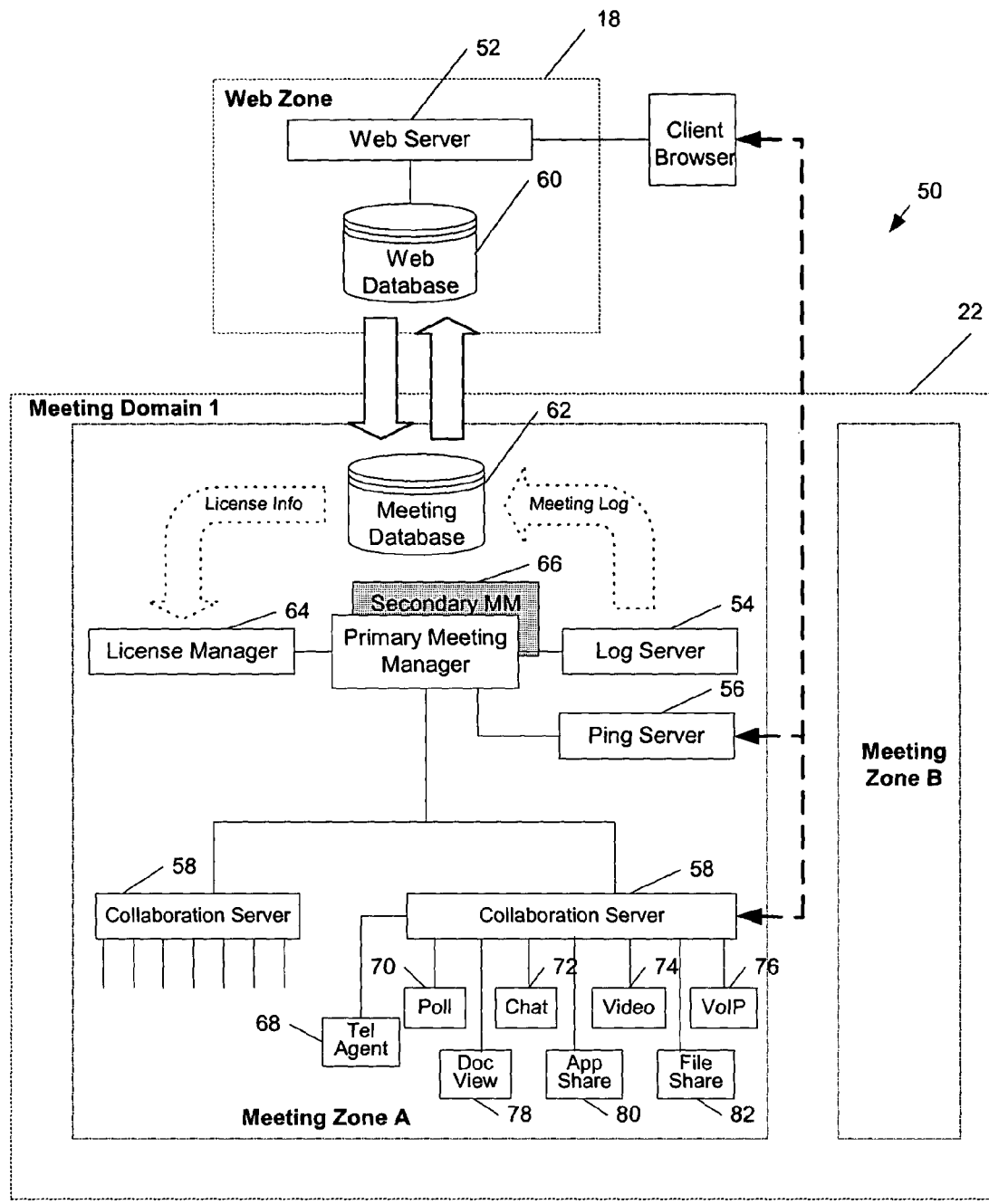
FIG. 2 illustrates an exemplary implementation for a computer system for a company meeting server and an interaction server, according to an embodiment of the present invention.

FIG. 2 illustrates an exemplary implementation for a computer system 50 for a company meeting server 18 and an interaction server 22, according to an embodiment of the present invention. In this computer system environment 50, a number of server computers and databases may be in communication to provide for collaborative meeting or computing. The details for such can be found in U.S. application Ser. No. 09/751,424 entitled "Distributed Network System Architecture for Collaborative Computing," filed on Dec. 29, 2000, assigned to the same assignee and incorporated by reference herein in its entirety.

Referring to FIG. 2, in environment 50, a number of processing facilities, including, for example, one or more of a web server 52, a log server 54, a ping server 56, and a collaboration server 58, license manager 64, primary and secondary meeting managers 66, application servers (e.g. telephone agent 68, poll 70, chat 72, video 74, voice over IP 76, document view 78, application share 80, and file share 82) may be integrated with a number of data storage facilities, such as, for example, a web database 60 and a meeting database 62 to implement a system for collaborative meetings over the Internet. As depicted, the processing and database facilities of environment 50 are divided into a web zone and one or more meeting zones for interaction with one or more client browsers (which can run on respective computers 12).

A web zone, which is an implementation for company meeting server 18, can be one or more server machines that share a common web database 60. In the web zone, web server 52 may have a unique IP address (which can be associated with a particular website) and responds to Hyper-Text Transport Protocol (HTTP) requests coming to that IP address from client browser. Web server 52 serves or supports web pages. Web database 60 may contain static information for the website including site specific data, web pages, and user data.

A meeting zone, which can be an implementation for interaction server 22, is a collection of servers and databases that help perform all the synchronous activity of an on-line collaborative meeting. In the meeting zone, the meeting managers 66 may be servers which communicate with other servers in the meeting zone (e.g., collaboration server 58, log server 54, ping server 56, etc.) to keep track of the on-line meetings in progress in the meeting zone. Meeting managers 66 may log meeting information into meeting database 62. Ping server 56 works with meeting managers 66 to determine a collaboration server 58 that is most suitable for hosting a particular meeting; it may act as a load balancer for the meeting service. Collaboration servers 58 may handle all real time control and communication during an on-line collaborative meeting. The application servers (e.g., servers 68 through 82) may support specific features that may be available as part of an on-line collaborative meeting, such as, for example, telephony, polling, chatting, video, voice over IP, document review, application sharing, and file sharing. License manager 64 may keep track of and enforce licensing conditions and charges for the meeting. The log server 54 keeps track of meeting logs. Meeting database 62 can maintain at least a portion of the transient data required to conduct and keep track of on-line meetings. This data would include, for example, site and user information that would be required to establish and conduct a meeting.

Methods for Initiating an On-Line Meeting from an IP Telephone

Figure 3A:
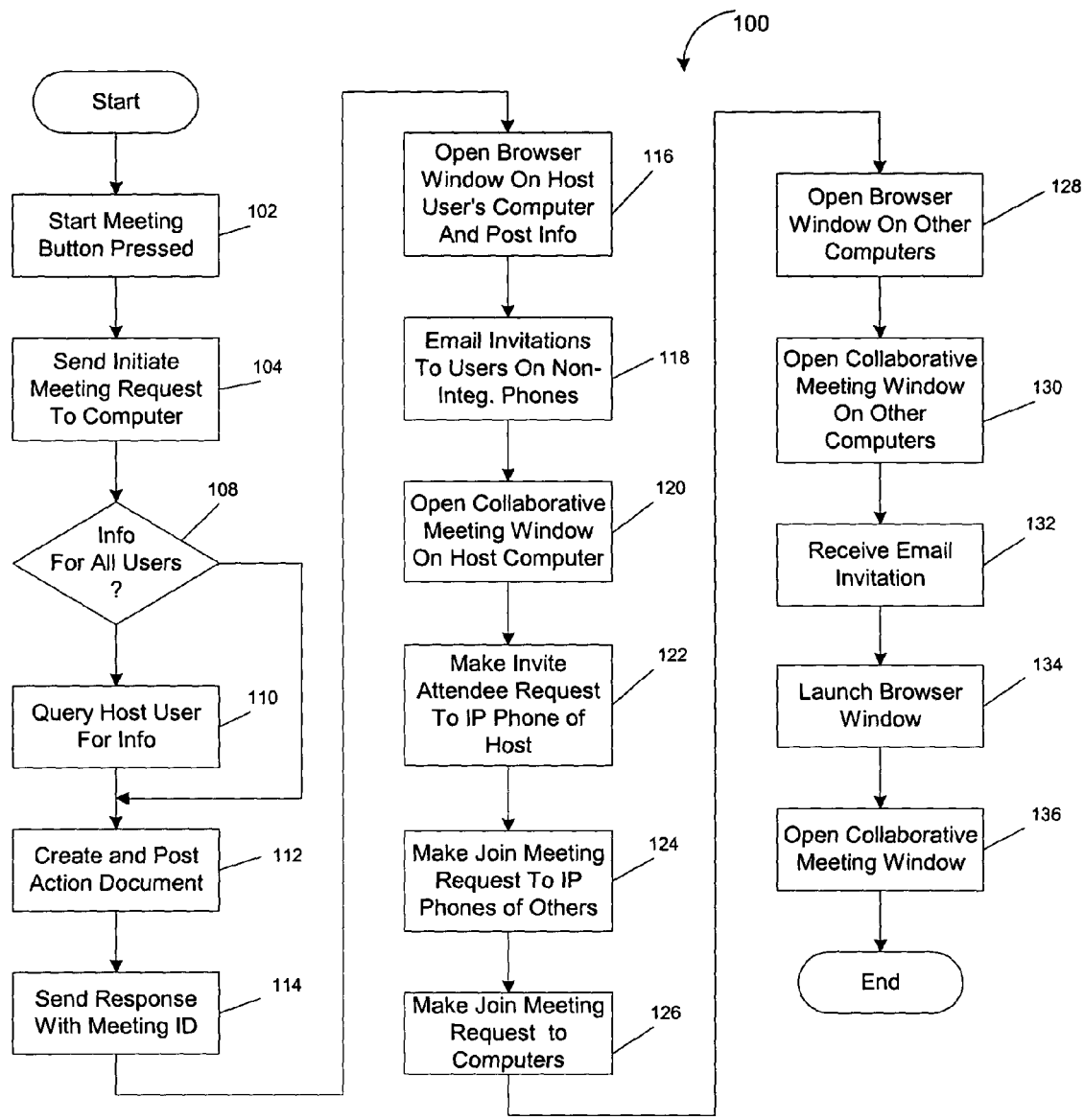
FIG. 3A illustrates a flow diagram of a method for initiating a collaborative computing session from an advanced capability telephone, according to an embodiment of the present invention.

FIG. 3A illustrates a method 100 for initiating a collaborative computing session from an advanced capability telephone, according to an embodiment of the present invention. In one embodiment, method 100 can be performed in one or more of the devices shown in FIG. 1A. Method 100 may be initiated by a user participating in a telephone conference via an IP telephone 12 who would like to initiate a collaborative computing session.

In an exemplary context for method 100, User1 is in a telephone conference call with User2 and User3. User1 and User2 are participating in the call using respective IP telephones 12a and 12b, each of each may have a phone start meeting module 24 installed or running thereon. User3 is participating using a regular (e.g., PSTN) telephone 14, which is non-integrated. User1, User2, and User3 have access to computers 16a, 16b, and 16c, respectively. During the conference call, User1 would like to have an on-line collaborative meeting with User2 and User3 in order to, for example, review, modify, and discuss an important document or file.

Referring to FIG. 3A, method 100 begins at block 102, where the "start meeting" button is pressed by User1 on his/her IP telephone 12a. In response, at block 104, phone start meeting module 24a (running on IP telephone 12a) sends an "initiate meeting" SIP request to the computer start meeting module 26a running on User1's computer 16a. This request message may include the telephone numbers (and names and email addresses if available) for each call participant (User2 & User3).

At block 108, computer start meeting module 26a determines if it has pertinent information (e.g., the email addresses) for all call participants using non-integrated telephones (i.e., a regular telephone 14 or an IP telephone 12 that is not configured or connected for automatic joining of an on-line meeting). In one embodiment, information for email addresses are potentially maintained in a contact database resident in computer 16a. If so, method 100 moves to block 112. Otherwise, at block 110, computer start meeting module 26a queries User1 for the email address for each call participant using a non-integrated telephone (for example, by opening a suitable dialog window and asking User1 to provide the desired information).

At block 112, computer start meeting module 26a creates an action document (which can be called "ActNewMeeting") and posts this document to the company meeting server 18. The action document, which can be written in XML, may include a request specifying a private (unlisted) meeting. The action document accesses the web zone to set up the on-line collaborative meeting. At block 114, the company meeting server 18 sends a response document to the computer start meeting module 26a on the computer 16a. The response document may contain a unique identifier (e.g., Meeting Key identifier) for the collaborative on-line meeting.

At block 116, the computer start meeting module 26a opens a browser window on computer 16a and posts (e.g., via HTTP) various information to the web zone or web pages (supported by the server start meeting module 28) on the company website for collaborative meeting. This information may include, for example, User1's username and password, the Meeting Key identifier, and the names and email addresses for every other user participating in the call. At block 118, the server start meeting module 28 emails invitations to all users on non-integrated telephones (e.g., User3). These email invitations may contain a URL for joining the collaborative meeting.

At block 120, the server start meeting module 28 will start an on-line collaborative meeting window on computer 16a of User1. User1 is now in attendance at the collaborative meeting. At block 122, the computer start meeting module 26a on computer 16a makes an "invite attendee" request back to phone start meeting module 24a on IP telephone 12a. Information for the Meeting Key identifier may be passed from the computer 16a to IP telephone 12a at this time.

At block 124, the phone start meeting module 24a of User1's IP telephone 12a makes a "join meeting" request to the phone start meeting module 24b of User2's IP telephone 12b. This request may pass the Meeting Key identifier to IP telephone 12b. At block 126, phone start meeting module 24b makes a "join meeting" request to the computer start meeting module 26b on User2's computer 16b, in which the Meeting Key identifier is passed to computer 16b.

At block 128, the computer start meeting module 26b opens a browser window on User2's computer 16b and requests the web page for joining a meeting, supported at company meeting server 18. Computer start meeting module 26b posts the Meeting Key identifier and User2's name & email address to a web page for the collaborative meeting.

At block 130, company meeting server 18 opens a collaborative meeting window at computer 16b, and User2 joins the on-line meeting started by User1. At block 132, User3 receives the invitation email on his/her computer 16c and clicks on the embedded "join meeting" URL. This launches a browser program at block 134 and opens a meeting window on computer 16c at clock 136, and User3 joins the meeting started by User1. Thereafter, method 100 ends.

Figure 3B:
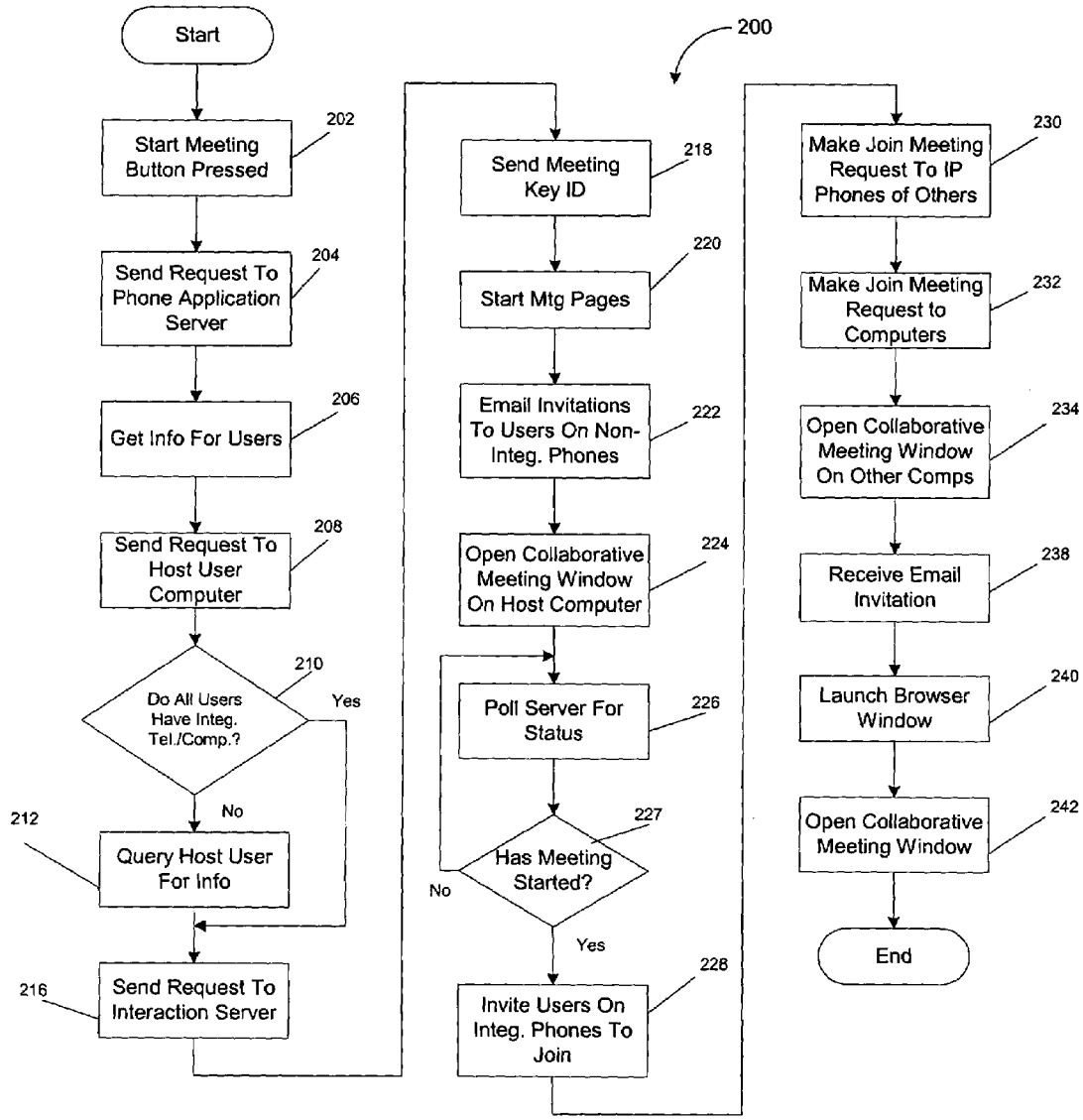
FIG. 3B illustrates a flow diagram of another method for initiating a collaborative computing session from an advanced capability telephone, according to an embodiment of the present invention.

FIG. 3B illustrates a method 200 for initiating a collaborative computing session from an advanced capability telephone, according to another embodiment of the present invention. In one embodiment, method 200 can be performed in one or more of the devices shown in FIG. 1B. Method 200 may be initiated by a user participating in a telephone conference via an IP telephone 12 who would like to initiate a collaborative computing session.

An exemplary context for method 200 depicted in FIG. 3B is similar to that for method 100 depicted in FIG. 3A. User1 is in a telephone conference call with User2 and User3. User1 and User2 are participating in the call using respective IP telephones 12a and 12b, each of each may have a phone start meeting module 24 installed or running thereon. User3 is participating using a regular (e.g., PSTN) telephone 14, which is non-integrated. The conference call may be managed by call manager system 32. User1, User2, and User3 have access to computers 16a, 16b, and 16c, respectively. During the conference call, User1 would like to have an on-line collaborative meeting with User2 and User3 in order to, for example, review, modify, and discuss an important document or file.

Method 200 begins at block 202 where a "start meeting" button on IP telephone 12a is pressed by User1. This causes IP telephone 12a at block 204 to make a request (referred to as a "HTTP GET" request) to the initiate meeting module 36 on company telephone application server 30. In this request, the IP telephone 12a may supply its Internet Protocol (IP) address or other identifying information. The initiate meeting module 36 on the company telephone application server 30 makes a request to the server meeting initiation module 38, also running on the application server 30.

At block 206, server meeting initiation module 38 makes a request (which can be JTAPI, TAPI, or XML) to the call manager system 32 to get information for the other IP telephones 12 and telephones 14 of the users who are in the conference call with User1. At block 208, server meeting initiation module 38 requests the computer initiate meeting module 40a running on computer 16a. Computer initiate meeting module 40a receives the list of IP telephones 12 and telephones 14 from server meeting initiation module 38.

At block 210, computer meeting initiator module 40a determines if all of the users involved in the conference call have integrated telephones and computers 16. If so, method 200 moves to step 216. Otherwise, as in the situation depicted in FIG. 1B, at block 212 computer meeting initiator module 40a queries User1 for the email address of User3, for example, by opening an email dialog window on computer 16a.

At block 216, computer meeting initiator module 40a makes a request to the XML API server module 44 at company meeting server 18 to create a collaborative meeting. At block 218, company meeting server 18 returns a Meeting Key identifier for the meeting to the computer meeting initiator module 40a. At block 220, computer meeting initiator module 40a makes a request (e.g., HTTP POST) to a start meeting pages 46 on the company meeting server 18. At block 222, the start meeting pages 46 sends an email to User3's computer 16c inviting User3 to join the collaborative meeting.

At block 224, start meeting page 46 starts a meeting client on User1's computer 16a. User1 then becomes the first attendee of the collaborative meeting. At block 226, computer meeting initiator module 40a on computer 16a polls the company meeting server 18 for a status of the meeting, for example, by using a "XML API getMeeting" message. At block 227, a determination is made as to whether the meeting has started. In one embodiment, this can be accomplished by checking a meeting status flag called "IN_PROGRESS" on the company meeting server 18. If the meeting has not started, then method 200 returns to block 226 where the company meeting server 18 is polled for meeting status.

Alternatively, if the meeting has started, then at block 228 computer meeting initiator module 40a commands server meeting initiation module 38 of the company telephone application server 30 to invite other users having IP telephones 12 (e.g., User2) to join the meeting. At block 230, server meeting initiation module 38 sends a request (referred to as "join-Meeting") to computer meeting initiator module 40b of User2's computer 16b.

At block 232 computer meeting initiator module 40b communicates with the company meeting server 18, for example, by sending a "join meeting" command to URL API server module 48. At block 234, a meeting client window starts on computer 16b of User2 (participating by integrated telephone), and thus User2 joins the on-line meeting started by User1. At block 238, User3 (participating by non-integrated telephone) receives the invitation email on his/her computer 16c and clicks on the embedded "join meeting" URL. This launches a browser program at block 240, and at block 242 starts the meeting client on computers 16c. The meeting client opens a collaborative meeting window, and User3 joins the meeting started by User1. Thereafter, method 200 ends.

Setting Meeting Passwords

Figure 4:
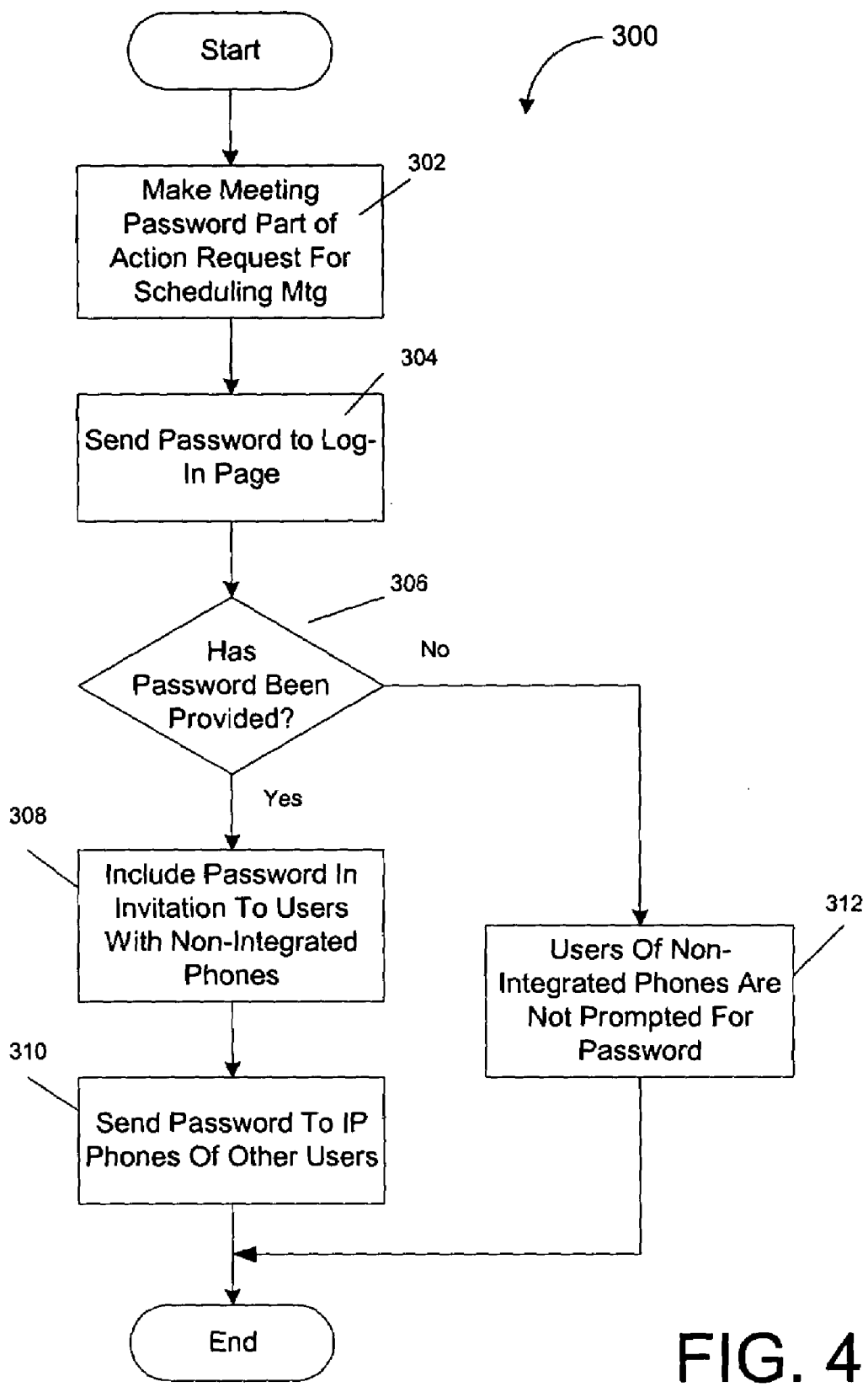
FIG. 4 illustrates a flow diagram of a method for using meeting passwords when initiating a collaborative meeting from an advanced capability telephone, according to an embodiment of the present invention.

FIG. 4 illustrates a method 300 for using meeting passwords when initiating a collaborative meeting from an advanced capability telephone, according to an embodiment of the present invention. Some portion of method 300 may be performed by one or more of the devices illustrated and described with reference to FIGS. 1A and 1B. As described herein, the meeting password can be automatically generated or selected by a user. If no meeting password is desired, then the meeting password field is set to an empty string.

Method 300 begins at block 302 where the meeting password, if any, is made a part of the XML ActNewMeeting( ) action request that schedules the meeting. At block 304, the meeting password is sent in an additional POST parameter passed to log-in page (AASM.php). If there is no meeting password, the empty string is sent.

At block 306, a determination is made on whether a meeting password has been provided (either automatically generated or selected by a user). If a meeting password has been provided, then at block 308 the log-in page (e.g., AASM.php) includes the meeting password in the email meeting invitations for users participating via non-integrated telephones (e.g., PSTN telephones). Such users will have to enter this password to enter the meeting. At block 310, the meeting password is also sent to the IP telephones 12 of the other users. The IP telephones 12 of such users forwards the meeting password on to the respective computers 16.

Otherwise, if a meeting password has not been provided (i.e., the meeting password is an empty string), then the email invitation to the non-integrated telephone users will not contain a meeting password, and at block 312 those non-integrated telephone attendees will not be prompted for a meeting password when joining the meeting. Thereafter, method 300 ends.

As described herein, with systems and methods, according to embodiments of the present invention, users can be in the middle of a telephone call and spontaneously decide they want to visually collaborate on a document. From his/her IP telephone, a caller can instantly activate an on-line meeting that will include all the call participants.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. A system for initiating a collaborative computing session during a telephone call involving a plurality of users, each user having a respective computer and at least some of the users having respective advanced capability telephones, the system comprising:

telephone activation means present on a first advanced capability telephone for generating an initiate meeting request in response to a user pressing a button on the first advanced capability telephone; and computer activation means present on a respective computer of the user having the first advanced capability telephone for establishing a meeting zone for the collaborative computing session in response to the meeting request from the first advanced capability telephone and for opening a first collaborative meeting window on the respective computer of the user having the first advanced capability telephone;

wherein the first advanced capability telephone is separate from the respective computer of the user having the first advanced capability telephone.

2. The system of claim 1 wherein the telephone activation means for issuing a join meeting request from the first advanced capability telephone to a second advanced capability telephone.

3. The system of claim 2 wherein the computer activation means for opening at least a second collaborative meeting window on a respective computer of the user having the second advanced capability telephone.

4. The system of claim 1 wherein the computer activation means for issuing an invite attendee request to the first advanced capability telephone, wherein the invite attendee request contains information for enabling a second collaborative meeting window to be opened on a respective computer of the user having a second advanced capability telephone.

5. The system of claim 1 wherein the computer activation means for sending an email invitation to each of the users who do not have an advanced capability telephone.

6. The system of claim 1 wherein establishing a meeting zone comprises:

creating an action document at the respective computer of the user having the first advanced capability telephone; and posting the action document to a meeting server.

7. The system of claim 1 wherein the first advanced capability telephone comprises an Internet Protocol telephone.

8. A method for initiating a collaborative computing session during a telephone call involving a plurality of users, each user having a respective computer and at least some of the users having a respective advanced capability telephone, the method comprising:

issuing an initiate meeting request from a first advanced capability telephone to a respective computer of the user having the first advanced capability telephone in response to a user pressing a button on the first advanced capability telephone, wherein the first advanced capability telephone is separate from the respective computer of the user having the first advanced capability telephone;

establishing a meeting zone for the collaborative computing session in response to the initiate meeting request received at the respective computer of the user having the first advanced capability telephone; and opening a first collaborative meeting window on the respective computer of the user having the first advanced capability telephone.

9. The method of claim 8 comprising issuing a join meeting request from the first advanced capability telephone to a second advanced capability telephone.

10. The method of claim 9 comprising opening at least a second collaborative meeting window on the respective computer of the user having the second advanced capability telephone.

11. The method of claim 8 comprising determining the email addresses for each of the users.

12. The method of claim 8 comprising querying the user having the first advanced capability telephone for the email addresses of each of the other users.

13. The method of claim 8 wherein establishing a meeting zone comprises:

creating an action document at the respective computer of the user having the first advanced capability telephone; and posting the action document to a meeting server.

14. The method of claim 13 wherein the action document is an XML document.

15. The method of claim 8 comprising issuing an invite attendee request to the first advanced capability telephone, wherein the invite attendee request contains information for enabling the second collaborative meeting window to be opened on the respective computer of the user having the second advanced capability telephone.

16. The method of claim 8 comprising sending a email invitation to each of the users who do not have an advanced capability telephone.

17. A system for initiating a collaborative computing session during a telephone call involving a plurality of users, the system comprising:

a first advanced capability telephone operable to issue an initiate meeting request in response to a user pressing a button on the first advanced capability telephone;

a first computer in communication with the first advanced capability telephone operable to issue a start meeting request for establishing a meeting zone in response to the meeting request from the first advanced capability telephone for the collaborative computing session, the first computer operable to open a first collaborative meeting window for enabling a user of the first computer to participate in the collaborative computing session;

wherein the first advanced capability telephone is separate from the respective computer of the user having the first advanced capability telephone; and wherein the first advanced capability telephone is operable to issue a join meeting request to a second advanced capability telephone for causing a second collaborative meeting window to be opened at a second computer for enabling a user of the second computer to participate in the collaborative computing session.

18. The system of claim 17 comprising a meeting server in communication with first and second computers, the meeting server operable to support the collaborative computing session.

19. The system of claim 16 wherein the first advanced capability telephone comprises an Internet Protocol telephone.

* * * * *